United States Patent
Zhang

(10) Patent No.: US 10,200,433 B2
(45) Date of Patent: Feb. 5, 2019

(54) CLIENT DEVICE, A METHOD FOR RECEIVING A STREAMING MEDIA DATA AND A STREAMING MEDIA DATA TRANSMISSION SYSTEM

(71) Applicant: BOE Technology Group Co., Ltd., Beijing (CN)

(72) Inventor: Chuxiong Zhang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 15/124,059

(22) PCT Filed: Jun. 19, 2015

(86) PCT No.: PCT/CN2015/081931
§ 371 (c)(1),
(2) Date: Sep. 7, 2016

(87) PCT Pub. No.: WO2016/112641
PCT Pub. Date: Jul. 21, 2016

(65) Prior Publication Data
US 2017/0019447 A1  Jan. 19, 2017

(30) Foreign Application Priority Data

Jan. 16, 2015 (CN) .......................... 2015 1 0024471

(51) Int. Cl.
*G06F 15/16* (2006.01)
*H04L 29/06* (2006.01)
(Continued)

(52) U.S. Cl.
CPC ........ *H04L 65/604* (2013.01); *H04L 65/4092* (2013.01); *H04L 67/42* (2013.01);
(Continued)

(58) Field of Classification Search
CPC ....... H04L 29/06; H04L 67/02; H04L 65/604; H04L 65/4092; H04L 67/42;
(Continued)

(56) References Cited

U.S. PATENT DOCUMENTS 9,294,531 B2 * 3/2016 Zhang .................. H04L 65/601
9,374,406 B2   6/2016 Gao et al.
(Continued)

FOREIGN PATENT DOCUMENTS

CN       102204272 A      9/2011
CN       103747283 A  *   4/2014
(Continued)

OTHER PUBLICATIONS

International Search Report and Written Opinion, including English translation of Box No. V, for International Application No. PCT/CN2015/081931, dated Sep. 24, 2015, 7 pages.
(Continued)

*Primary Examiner* — Benjamin M Thieu
(74) *Attorney, Agent, or Firm* — Westman, Champlin & Koehler, P.A.

(57) ABSTRACT

The present application relates to a client device, a method for receiving a streaming media data and a streaming media data transmission system. In the client device, a transceiver transmits a request for a segment to a server and receives the segment transmitted from the servers. If it is determined by a processor that the transceiver does not receive a first segment transmitted from the server within the preset threshold time from transmitting the request for the first segment to the server, the processor controls the transceiver to transmit a request for a second segment having the same media content and a lower transmission bit rate to the server.

12 Claims, 4 Drawing Sheets

(51) Int. Cl.
*H04N 21/2343* (2011.01)
*H04N 21/262* (2011.01)
*H04N 21/442* (2011.01)
*H04N 21/6377* (2011.01)
*H04N 21/845* (2011.01)
*H04L 29/08* (2006.01)

(52) U.S. Cl.
CPC . *H04N 21/23439* (2013.01); *H04N 21/26258* (2013.01); *H04N 21/44209* (2013.01); *H04N 21/6377* (2013.01); *H04N 21/8456* (2013.01); *H04L 67/02* (2013.01)

(58) Field of Classification Search
CPC ......... H04N 21/6377; H04N 21/44209; H04N 21/23439; H04N 21/8456; H04N 21/26258; H04N 21/43
See application file for complete search history.

(56) References Cited

U.S. PATENT DOCUMENTS

| | | |
|---|---|---|
| 2003/0161401 A1 | 8/2003 | Shen et al. |
| 2014/0156863 A1 | 6/2014 | Gao et al. |
| 2016/0127440 A1* | 5/2016 | Gordon ............ H04N 21/23439 709/219 |
| 2016/0127754 A1* | 5/2016 | Lee .................. H04N 21/23805 725/62 |
| 2016/0134673 A1* | 5/2016 | MacInnis ................ H04L 65/60 709/231 |

FOREIGN PATENT DOCUMENTS

| | | |
|---|---|---|
| CN | 103747283 A | 4/2014 |
| CN | 104581340 A | 4/2015 |
| WO | 2011150657 A1 | 12/2011 |
| WO | 2013130473 A1 | 9/2013 |

OTHER PUBLICATIONS

First Office Action for Chinese Patent Application No. 201510024471. 0, dated Mar. 21, 2017, 12 pages.
Second Office Action from Chinese Patent Application No. 201510024471.0, dated May 27, 2017, 13 pages.
Extended European Search Report for European Patent Application No. 15877556.9, dated Jun. 26, 2018, 8 pages.

* cited by examiner

CLIENT DEVICE, A METHOD FOR RECEIVING A STREAMING MEDIA DATA AND A STREAMING MEDIA DATA TRANSMISSION SYSTEM

CROSS-REFERENCE TO RELATED APPLICATIONS

This application is a Section 371 National Stage Application of International Application No. PCT/CN2015/081931, filed on Jun. 19, 2015 and entitled with "A CLIENT DEVICE, A METHOD FOR RECEIVING A STREAMING MEDIA DATA AND A STREAMING MEDIA DATA TRANSMISSION SYSTEM", and claims priority to Chinese Application No. 201510024471.0, filed on Jan. 16, 2015, the contents of which are incorporated herein by reference in their entirety.

TECHNICAL FIELD

The present disclosure relates to a field of streaming media technology, and in particular, to a client device, a method for receiving a streaming media data and a streaming media data transmission system.

BACKGROUND

Dynamic Adaptive Streaming (DASH) standard specified by Moving Pictures Experts Group (MPEG), also referred as MPEG DASH standard, is a standardized scheme for transmitting the streaming media data with an internet streaming media technology.

SUMMARY

According to a first aspect of the embodiments of the present disclosure, a client device is provided, which may comprise:
a transceiver module, configured to transmit a request for a segment to a server and receive the segment transmitted from the server;
a processing module, configured to determine whether or not the transceiver module receives a first segment from the server within a preset threshold time from transmitting the request for the first segment to the server; and if the first segment is not received within the preset threshold time, to control the transceiver module to transmit a request for a second segment to the server,
wherein media contents contained in the first segment is the same as the media contents contained in the second segment, and a bit rate of the first segment is higher than the bit rate of the second segment.

According to a second aspect of the embodiments of the present disclosure, a method for receiving a streaming media data is provided, which may comprise:
making a request for a first segment to a server;
determining whether or not the first segment transmitted from the server is received within a preset threshold time from making the request for the first segment to the server; and
if the first segment is not received within the preset threshold time, making a request for a second segment to the server,
wherein media contents contained in the first segment is the same as the media contents contained in the second segment, and a bit rate of the first segment is higher than the bit rate of the second segment.

According to a third aspect of the embodiments of the present disclosure, a streaming media data transmission system is provided, comprising:
a server, configured to transmit a segment to a client device according to a request of the client device;
the client device, configured to send a request for a first segment, to determine whether or not the first segment transmitted from the server is received within a preset threshold time from making the request for the first segment to the server, and if the first segment is not received within the preset threshold time, to send a request for a second segment to the server,
wherein media contents contained in the first segment is the same as the media contents contained in the second segment, and the bit rate of the first segment is higher than the bit rate of the second segment.

DETAILED DESCRIPTION

Figure 1:
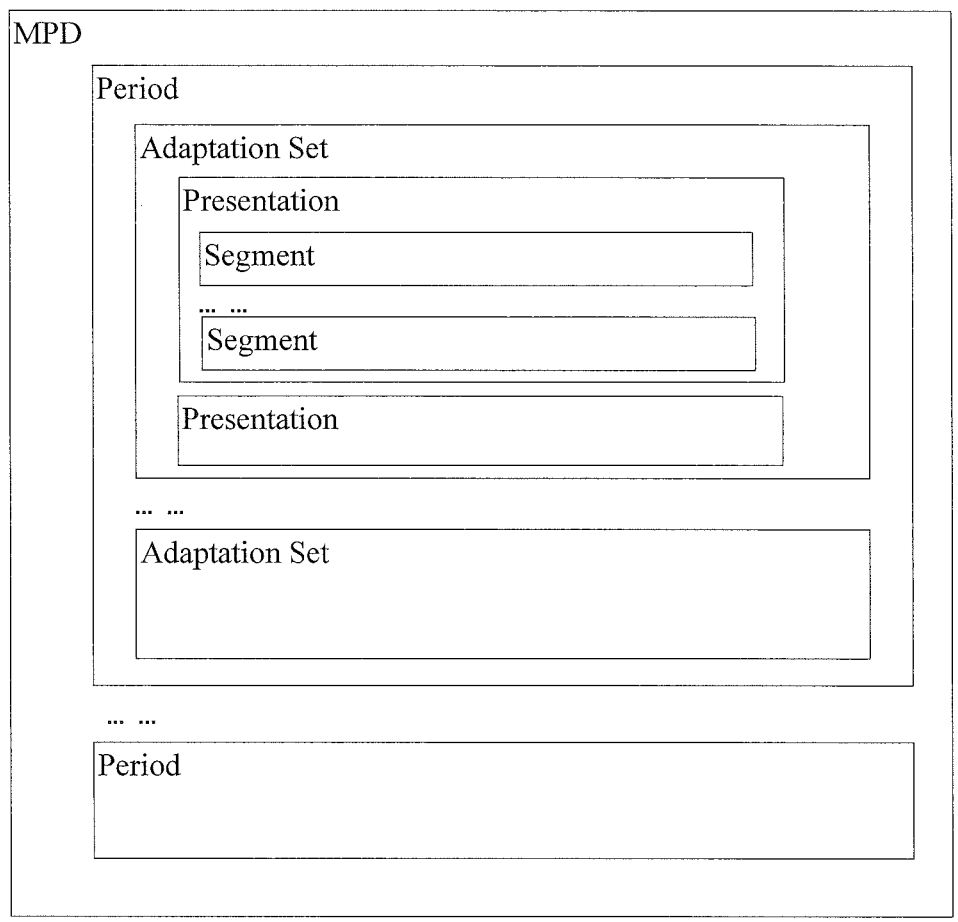
FIG. 1 shows a MPD hierarchical structure defined by the MEPG DASH standard.

A hierarchical structure model of Media Presentation Description (MPD) defined by the MEPG DASH standard is shown in FIG. 1.

In the model, Period is used to describe a media content which can be played for a while. Media contents described with periods which are closed to each other are continuous in time. One period may comprise a plurality of adaptation sets, each of which may describe media contents having various bit rates, and each bit rate corresponds to one presentation. The presentation may describe information on the media content, such as a specific package format, a bit rate and a coding/decoding parameter and the like. One presentation may comprise uniform resource locators (URL) of the plurality of segments, which are used for indicating storage locations of corresponding segments. The segment may contain a specific media content, i.e. an audio, a video, a subtitle, a multiplexed audio and video, and the like.

Figure 2:
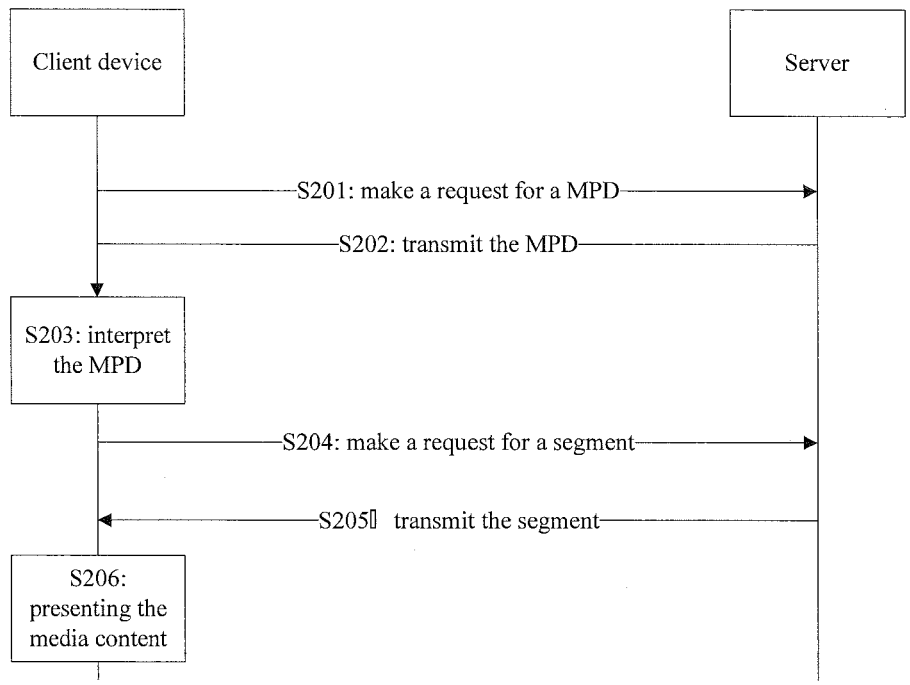
FIG. 2 is a flow chart illustrating a procedure for acquiring and presenting a media content by a client device under the MPD hierarchical structure shown in FIG. 1.

Under the MPD hierarchical structure model defined by the MEPG DASH standard shown in FIG. 1, a flow chart for acquiring and presenting the media content in a conventional is shown in FIG. 2, which may comprise:

S201: making a request for a MPD to a server, by a client device;

S202: transmitting the MPD to the client device from the sever;

S203: interpreting the MPD and acquiring information, such as a URL and a presentation sequence of associated segments from the MPD, by the client device;

S204: making a request for a segment to the sever, by the client device;

S205: transmitting the segment to the client device from the sever; and

S206: presenting the media content according to the received segment by the client device, which may comprise calling a segment interpreting module to interpret the received segment so as to acquire the media content and provide it to a media player for presenting.

In acquiring the media content by the client device, a network condition between the client device and the server varies a lot. The client device may collect information such as a time duration for acquiring a content, a time duration for decoding, a playable duration of the media content buffered in the client device and the like; determine the network condition with the server according to these factors; and determine whether to send a request for the segment having a high bit rate, a low bit rate or a same bit rate dynamically in combination with information contained in the MPD.

If the network condition suddenly degrades in acquiring the media content by the client device, for example, the available bandwidth of the network decreases, the client device may not adjust the bit rate in time, which will cause the time duration for acquiring the media content by the client device being too long and even lead to an interruption of the playing of the media content. At present, there is no method for solving the problem.

Embodiments of the present disclosure provide a client device, a method for receiving a streaming media data and a streaming media data transmission system, which can solve the problem that the client device cannot adjust the bit rate in time when the network condition between the client device and the server suddenly degrades, which may cause the time duration for acquiring the media content, and even may lead to an interruption of the playing of the media content.

If the client device according to the embodiments of the present disclosure does not receive the segment transmitted from the sever in a preset threshold time, the client device will send another request for a segment having the same media content but a lower bit rate to the server. By setting the preset threshold time such that the segment having a lower bit rate is acquired if the preset threshold time is expired, the client device can adjust the bite rate in time, so as to acquire the media content as quickly as possible, thereby ensuring a continuity of playing of the media content.

In the following, the embodiments of the present disclosure will be discussed in combination with the drawings. Firstly, the streaming media data transmission system and the client device according to the embodiments of the present disclosure will be described, and then the method for receiving the streaming media data according to the embodiments of the present disclosure will be described.

Figure 3A:
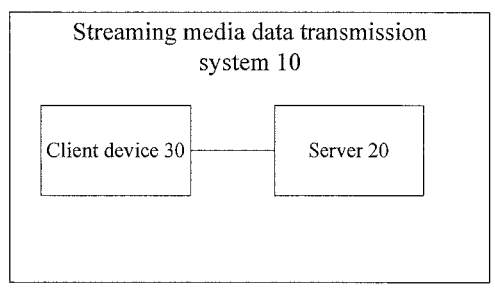
FIG. 3A shows a structural diagram illustrating a streaming media data transmission system according to the embodiments of the present disclosure.

FIG. 3A shows a structural diagram illustrating a streaming media data transmission system 10 according to the embodiments of the present disclosure. As shown in FIG. 3*a*, the streaming media data transmission system 10 may comprise a client device 30 and a server 20, wherein the server 20 is configured to transmit a segment to a client device 30 according to a request of the client device 30.

Figure 3B:
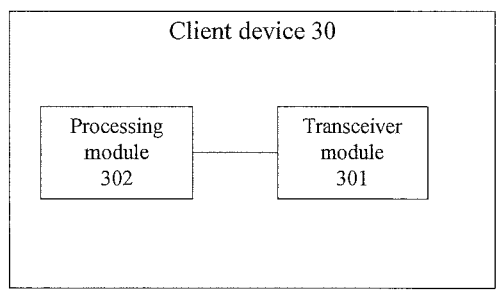
FIG. 3B shows a structural diagram illustrating a client device according to the embodiments of the present disclosure.

FIG. 3B shows a structural diagram illustrating the client device 30 according to the embodiments of the present disclosure. As shown in FIG. 3B, the client device 30 may comprise a transceiver module 301 and a processing module 302.

The transceiver module 301 may be configured to transmit a request for a segment to the server 20 and receive the segment transmitted from the server 20.

The processing module 302 may be configured to determine whether or not the transceiver module 301 receives a first segment from the server 20 within a preset threshold time from transmitting the request for the first segment to the server 20. If the first segment is not received within the preset threshold time, the processing module may control the transceiver module 301 to transmit a request for a second segment to the server 20.

Furthermore, media contents contained in the first segment is the same as the media contents contained in the second segment, and a bit rate of the first segment is higher than the bit rate of the second segment.

Figure 4:
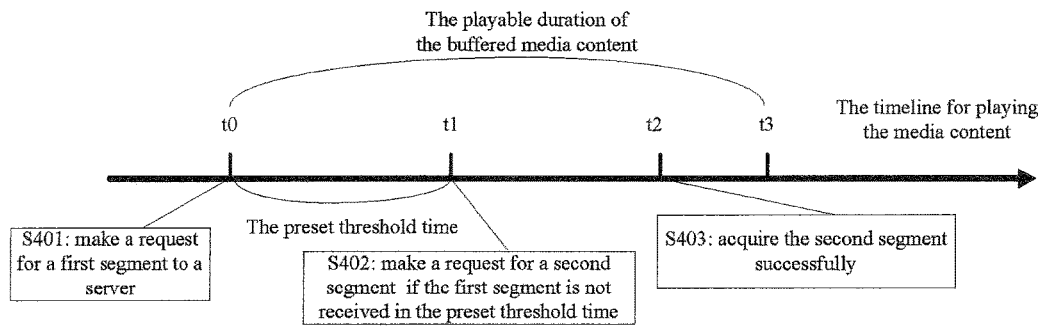
FIG. 4 is a timing diagram of playing the media content by the client device according to the embodiments of the present disclosure.

FIG. 4 is a timing diagram of playing the media content by the client device 30. As shown in FIG. 4, the media content buffered in the client device 20 at a time t0 would be completed at a time t3, i.e. the playable duration of the buffered media content is t3-t0.

FIG. 4 also shows steps operated by the client device at respective times. At the time t0, the client device 20 may perform step S401, in which a request for a first segment is send to the server and a timer is triggered to start working, and the timing duration of the timer is set as the preset threshold time.

At a time t1, when the timer expires, the client device 30 may perform step S402, i.e. requesting for a second segment, At a time t2, the client device 30 may perform step S403, i.e. acquiring a second segment successfully.

Since the time t2 is a time previous the time t3, the client device 30 has already acquired the second segment before completing the playing of the buffered media content, which may avoid an interrupt of playing of the media content, thereby ensuring a continuity of playing of the media content.

Alternatively, the client device 30 may abandon the request for the first segment after the time t1.

Generally, the expiration of receiving a segment only occurs under a network congestion condition. At this time, the abandoning of the request for the first segment by the client device 30 may relief the network congestion condition effectively, and thus the network can go back to normal as soon as possible.

In other words, if it is determined by the client device 30 that the first segment transmitted from the server 20 is not received within a preset threshold time from making the request for the first segment to the server 20, the client device 30 may give up receiving the first segment. For example, at the time t1, the client device 30 may send a request for a second segment to the server, and meanwhile may transmit a message informing the abandoning of the request for the first segment to the server. When the server receives the message informing the abandoning of the request for the first segment, it will stop attempting to transmit the first segment to the client device.

Preferably, the client device 30 may set the preset threshold time in advance according to following factors:

a bit rate of each of N segments acquired previous the first segment;

a time duration required for acquiring each of the N segments; and the bit rate of the first segment, wherein N is a positive integer.

For example, by taking N=1 for an example, the bit rate of the segment acquired previous the first segment by the client device 30 is BWs, i.e. the value for the bandwidth properties of the presentation to which the segment belongs, in particular, referred to table 1 for details;

the time duration required for acquiring the segment previous the first segment by the client device 30, i.e. the time duration from requesting the segment to acquiring the segment, is Ts; and the bit rate of the first segment to be acquired by the client device 30 is BWx, i.e. the value for the bandwidth properties of the presentation to which the first segment belongs, in particular, referred to table 1 for details.

Thus, the preset threshold time Tx can be calculated as:

$$Tx = \frac{Ts \cdot BWx}{BWs}$$

For another example, by taking N=3 for an example, the bit rate of the 3 segments acquired previous the first segment by the client device 30 are BW1, BW2 and BW3 respectively;

the time durations required for acquiring the 3 segments by the client device 30 are T1, T2 and T3 respectively; and the bit rate of the first segment to be acquired by the client device 30 is BWx.

Thus, in an alternative embodiment, the preset threshold time Tx can be calculated as:

$$Tx = \frac{(T1 + T2 + T3)BWx}{BW1 + BW2 + BW3}$$

In this manner, by taking a consideration of the transmission conditions of several segments previous the first segment, the preset threshold time can be a long term variable factor reflecting the network condition between the client device 30 and the server 20.

In an alternative embodiment, the preset threshold time Tx can be calculated as:

$$Tx = \min\left(\frac{T1 \cdot BWx}{BW1}, \frac{T2 \cdot BWx}{BW2}, \frac{T3 \cdot BWx}{BW3}\right)$$

In this manner, by taking a consideration of the transmission conditions of several segments previous the first segment, the minimum time duration can be selected as the preset threshold time, which can reduce the time delay caused by failing in acquiring the first segment more effectively.

Furthermore, the client device 30 can also take a consideration of the playable duration of the buffered media content (i.e. t3-t0 in FIG. 4) in setting the preset threshold time. In particular, the preset threshold time Tx can be alternatively calculated as:

$$Tx = \min\left(\frac{Ts \cdot BWx}{BWs}, t3 - t0 - \frac{Ts \cdot BWx}{BWs}\right)$$

Since the bit rate of the second segment is lower than the bit rate of the first segment, the time duration required for acquiring the second segment is generally longer than the time duration required for acquiring the first segment. In this manner, it is ensured that the client device 30 may have enough time to acquire the second segment when the timer expires, so as to avoid the interruption of playing of the media content.

Table 1 the properties of the presentation to which the segment described in the MPD belongs

| Names of the element/property | Description |
| --- | --- |
| Presentation | a presentation element |
| @bandwidth | a network bandwidth required for transmitting the segments contained in the presentation; a higher bit rate of the content contained in the segments comes with a wider network bandwidth required for transmitting the segments |
| @frameRate | a frame rate of the content contained in the segments; a higher bit rate of the content contained in the segments comes with a higher frame rate |
| SegmentList | a segment list |
| @duration | a playable duration for each segment; the playable durations of segments contained in one presentation are the same and counted in seconds. |
| @startNumber | an index for the first segment contained in the presentation |
| SegmentURL | a real address to acquire the segment; each segment corresponds to one SegmentURL. |

Preferably, when it is determined by the client device 30 that the first segment transmitted from the server 20 is not received within the preset threshold time from making the request for the first segment to the server 20, before making the request for the second segment to the server 20, the client device 30 may select the second segment among one or more segments having different bit rates, according to a network congestion condition occurred between the client device 30 and the server 20; and the media contents contained in the one or more segments are the same as the media contents contained in the first segment, and the bit rate of the one or more specific segments is lower than the bit rate of the first segment.

The client device 30 may determine the presentation which the first segment belongs to as R1, and the request for the first segment has been abandoned; read the value of the bandwidth properties of the presentation R1, as BW1; determine other presentations which are in the same adaptation set as R1; read the values of the bandwidth properties of these presentations; find the presentation R2 having a bit rate lower than R1; and send a request for a segment described by R2 to the server, i.e. the second segment.

If there are a plurality of presentations having a bit rate lower than R1, the client device 30 may further select one segment from the plurality of presentations according to the network congestion condition occurred between the client device 30 and the server 20.

In particular, if the network condition is heavily congested, the segment having a lower bit rate may be selected from the plurality of segments, otherwise the segment having a higher bit rate may be selected.

Preferably, the client device 30 may determine the network congestion condition according to parameters, such as, a round trip time from making a request for a segment to the server 20 to receiving a response from the server 20 and a playable duration of the buffered media content.

Figure 5:
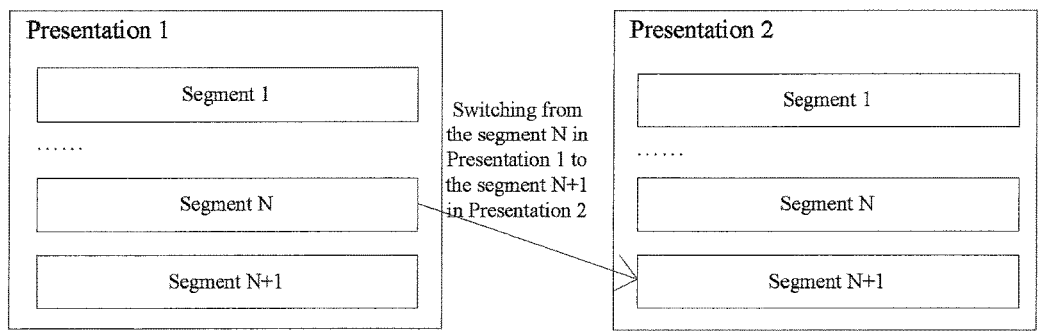
FIG. 5 is a schematic diagram illustrating a bit rate switching manner.

In an embodiment, the client device 230 may switch bit rates in a manner shown in FIG. 5.

The client device 30 may find the presentation which a being played segment belongs to, in a MPD (for clarity, represented by "presentation 1"); calculate a sequence number for the being played segment as startNumber+N, according to a value of startNumber properties in the "presentation 1" and the sequence number of the SegmentURL element corresponding to the being played segment (represented by N); then, find other presentations having the same media content but different bit rate, being in the same adaptation set as the "presentation 1" and going to be switched to (represented by "presentation 2"); find the segment having the sequence number being startNumber+N+1 in the "presentation 2"; and sequentially, send a request for the segment N+1 in the "presentation 2" to the server 20.

Based on the same inventive concept, the embodiments of the present disclosure further provide a method for receiving a streaming media data. A specific implementation thereof can be known with reference to the description of the client device and the streaming media data transmission system discussed above, since the principle of the method is similar with the client device and the streaming media data transmission system. Thus, the same content will no longer be repeated.

Figure 6:
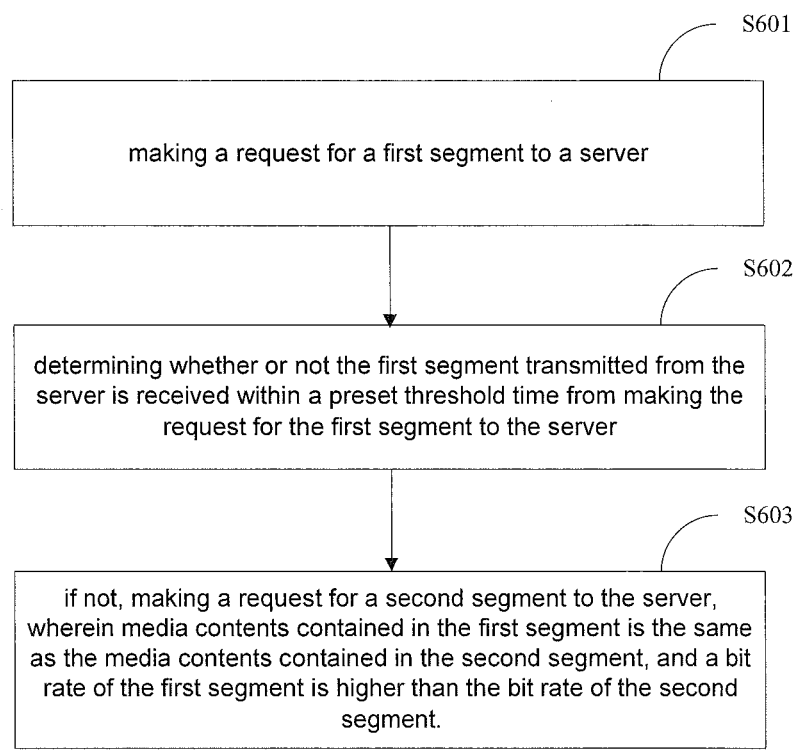
FIG. 6 is a flow chart illustrating a method for receiving the streaming media data according to the embodiments of the present disclosure.

FIG. 6 is a flow chart illustrating the method for receiving the streaming media data according to the embodiments of the present disclosure. As shown in FIG. 6, the method may comprise:

S601: making a request for a first segment to a server;

S602: determining whether or not the first segment transmitted from the server is received within a preset threshold time from making the request for the first segment to the server; and S603: if the first segment is not received within the preset threshold time, making a request for a second segment to the server, wherein media contents contained in the first segment is the same as the media contents contained in the second segment, and a bit rate of the first segment is higher than the bit rate of the second segment.

Preferably, before determining whether or not the first segment transmitted from the server is received within the preset threshold time from making the request for the first segment to the server, the method may further comprise:

determining the preset threshold time, according to the bit rate of each of N segments acquired previous the first segment, a time duration required for acquiring each of the N segments and the bit rate of the first segment;

wherein N is a positive integer.

Preferably, the determining the preset threshold time may comprise:

determining the preset threshold time, according to the bit rate of each of N segments acquired previous the first segment, a time duration required for acquiring each of the N segments, the bit rate of the first segment and a playable duration of the buffered media content.

Preferably, the preset threshold time is determined according to one of following equations:

$$Tx = \frac{\left(\sum_{i=1}^{N} Ti\right) BWx}{\sum_{i=1}^{N} BWi}, \text{ or}$$

$$Tx = \min_{1 \le i \le N}\left(\frac{Ti \cdot BWx}{BWi}\right), \text{ or}$$

$$Tx = \min\left(\frac{Ts \cdot BWx}{BWs}, t3 - t0 - \frac{Ts \cdot BWx}{BWs}\right)$$

wherein Tx indicates the preset threshold time; BWi indicates the bit rate of a $i^{th}$ segment previous the first segment; BWx indicates the bit rate of the first segment; Ti indicates the time duration required for acquiring the $i^{th}$ segment acquired before the first segment by the transceiver module, wherein i and N are both positive integers, and $1 \le i \le N$; Ts indicates the time duration required for acquiring the previous segment of the first segment by the transceiver module; BWs indicates the bit rate of the previous segment of the first segment acquired by the transceiver module; t0 is a time when the transceiver module transmits the request for the first segment to the server; t3 is a time on which a playback of the media content buffered in the client device at t0 would be completed; and min(.) indicates an operation of calculating a minimum.

Preferably, when it is determined that the first segment transmitted from the server is not received within the preset threshold time from making the request for the first segment to the server, before making the request for the second segment to the server, the method may further comprise:

selecting the second segment among one or more segments having different bit rates, according to a network congestion condition occurred between the client device and the server, wherein the media contents contained in the one or more segments are the same as the media contents contained in the first segment, and the bit rate of the one or more specific segments is lower than the bit rate of the first segment.

Preferably, if it is determined that the first segment transmitted from the server is not received within the preset threshold time from making the request for the first segment to the server, the method may further comprise:

transmitting a message informing abandoning of the request for the first segment to the server.

Thus, in the embodiments of the present disclosure, if the client device does not receive the segment transmitted from the sever in a preset threshold time, the client device will send another request for a segment having the same media content but a lower bit rate to the server. By setting the preset threshold time such that the segment having a lower bit rate is acquired if the preset threshold time is expired, the client device can adjust the bite rate in time, so as to acquire the media content as quickly as possible, thereby ensuring a continuity of playing of the media content.

It should be understand that the embodiments of the present disclosure may be provided as a method, a system or a computer programming product. Therefore, the present disclosure can be implemented with a purely hardware implementation, a purely software implementation or an implementation combining the hardware and the software. Furthermore, the present disclosure can also be implemented with a computer programming product performed on one or more computer available storage medium on which a computer available program code can be recorded (including but not limited to, a disc storage, a CD-ROM, an optical storage and the like).

The present disclosure is described by reference to the flowcharts and/or block diagrams of the method, the device (system) and the computer program product according to the embodiments of the present disclosure. It will be understood by those within the art that each operation and/or block and a combination thereof within such block diagrams and/or flowcharts may be implemented with computer program instructions. These computer program instructions can be provided to a general purpose computer, a dedicated application computer, an embedded processor or other processor of a programmable data processing device, so as to generate a machine such that the instructions performed by the computer or the processors of the programmable data processing device may be used for implementing an apparatus that can perform the functions defined by the operation and/or block and a combination thereof within such block diagrams and/or flowcharts.

These computer program instructions can be stored in a computer readable memory which can guide the computer or the processors of the programmable data processing device to operate in a certain manner, such that the instructions stored in the computer readable memory can generate a manufacture comprising the instruction device. The instruction device can implement the functions defined by each operation and/or block and a combination thereof within such block diagrams and/or flowcharts.

These computer program instructions can also be loaded to the computer or other programmable data processing devices, such that a series of operations can be implemented by the programmable data processing device to generate a computer-implemented process. Thus, the functions defined by each operation and/or block and a combination thereof within such block diagrams and/or flowcharts can be realized by the instructions implemented on the computer or other programmable device.

Although the preferred embodiments of the present disclosure are described, various changes and modifications to the embodiments can be made in view of the basic inventive concept of the present disclosure. Thus, the claims are intended to comprise the preferred embodiments and all changes and modifications which belong to the scope of the present disclosure.

Obviously, those skilled in the art can make various modifications and variations to the present disclosure without departing from the spirit and scope of the present disclosure. Thus, if these modifications and variations of the present disclosure belong to the scope of the claims of the present disclosure and the equivalent technologies thereof, the present disclosure is also intended to include these modifications and variations.

I claim:

1. A client device, comprising:
   a transceiver, configured to transmit a request for a segment containing media content to a server and receive the segment transmitted from the server;
   a processor, configured to determine whether or not the transceiver receives a first segment from the server within a preset threshold time from transmitting the request for the first segment to the server; and if the first segment is not received within the preset threshold time, to control the transceiver to transmit a request for a second segment to the server,
   wherein the media contents contained in the first segment is the same as the media contents contained in the second segment, and a transmission bit rate of the first segment is higher than a transmission bit rate of the second segment;
   wherein the processor is further configured to:
   determine the preset threshold time, as a minimum value calculated from the transmission bit rate of each of N segments acquired previous the first segment by the transceiver, a time duration required for acquiring each of the N segments, the transmission bit rate of the first segment and a playable duration of the media content buffered in the client device, wherein N is an integer greater than 1.

2. The client device of claim 1, wherein the processor is further configured to determine the preset threshold time according to one of following equations:

$$Tx = \frac{\left(\sum_{i=1}^{N} Ti\right) BWx}{\sum_{i=1}^{N} BWi}, \text{ or}$$

$$Tx = \min_{1 \leq i \leq N}\left(\frac{Ti \cdot BWx}{BWi}\right), \text{ or}$$

$$Tx = \min\left(\frac{Ts \cdot BWx}{BWs}, t3 - t0 - \frac{Ts \cdot BWx}{BWs}\right)$$

wherein Tx indicates the preset threshold time; BWi indicates the transmission bit rate of a $i^{th}$ segment previous the first segment; BWx indicates the transmission bit rate of the first segment; Ti indicates the time duration required for acquiring the $i^{th}$ segment acquired before the first segment by the transceiver, wherein i and N are both positive integers, and $1 \leq i \leq N$; Ts indicates the time duration required for acquiring the previous segment of the first segment by the transceiver; BWs indicates the transmission bit rate of the previous segment of the first segment acquired by the transceiver; t0 is a time when the transceiver transmits the request for the first segment to the server; t3 is a time on which a playback of the media content buffered in the client device at t0 would be completed; and min(•) indicates an operation of calculating a minimum.

3. The client device of claim 1, wherein when it is determined that the transceiver does not receive the first segment transmitted from the server within the preset threshold time from transmitting the request for the first segment to the server, the processor is further configured to, before transmitting the request for the second segment to the server:
   select the second segment among one or more segments having different transmission bit rates, according to a network congestion condition occurred between the client device and the server,
   wherein the media contents contained in the one or more segments are the same as the media contents contained in the first segment, and the transmission bit rate of the one or more specific segments is lower than the bit rate of the first segment.

4. The client device of claim 1, wherein the processor is further configured to:
   if it is determined that the transceiver does not receive the first segment transmitted from the server within the preset threshold time from transmitting the request for the first segment to the server, control the transceiver to transmit a message informing abandoning of the request for the first segment to the server.

5. A method for receiving a streaming media data, comprising:
   making a request for a first segment containing media content to a server;
   determining a preset threshold time, as a minimum value calculated from the transmission bit rate of each of N segments acquired previous the first segment by the transceiver, a time duration required for acquiring each of the N segments, a transmission bit rate of the first segment and a playable duration of the media content buffered, wherein N is an integer greater than 1;

determining whether or not the first segment transmitted from the server is received within preset threshold time from making the request for the first segment to the server; and if the first segment is not received within the preset threshold time, making a request for a second segment to the server, wherein media contents contained in the first segment is the same as the media contents contained in the second segment, and the transmission bit rate of the first segment is higher than a transmission bit rate of the second segment.

6. The method of claim 5, wherein determining the preset threshold time comprises determining the preset threshold time according to one of following equations:

$$Tx = \frac{\left(\sum_{i=1}^{N} Ti\right) BWx}{\sum_{i=1}^{N} BWi}, \text{ or}$$

$$Tx = \min_{1 \leq i \leq N}\left(\frac{Ti \cdot BWx}{BWi}\right), \text{ or}$$

$$Tx = \min\left(\frac{Ts \cdot BWx}{BWs}, t3 - t0 - \frac{Ts \cdot BWx}{BWs}\right)$$

wherein Tx indicates the preset threshold time; BWi indicates the transmission bit rate of a $i^{th}$ segment previous the first segment; BWx indicates the transmission bit rate of the first segment; Ti indicates the time duration required for acquiring the $i^{th}$ segment acquired before the first segment by a transceiver, wherein i and N are both positive integers, and $1 \leq i \leq N$; Ts indicates the time duration required for acquiring the previous segment of the first segment by the transceiver; BWs indicates the transmission bit rate of the previous segment of the first segment acquired by the transceiver; t0 is a time when the transceiver transmits the request for the first segment to the server; t3 is a time on which a playback of the media content buffered in the client device at t0 would be completed; and min(•) indicates an operation of calculating a minimum.

7. The method of claim 5, wherein when it is determined that the first segment transmitted from the server is not received within the preset threshold time from making the request for the first segment to the server, before making the request for the second segment to the server, the method further comprise:

selecting the second segment among one or more segments having different transmission bit rates, according to a network congestion condition occurred between the client device and the server, wherein the media contents contained in the one or more segments are the same as the media contents contained in the first segment, and the transmission bit rate of the one or more specific segments is lower than the transmission bit rate of the first segment.

8. The method of claim 5, wherein if it is determined that the first segment transmitted from the server is not received within the preset threshold time from making the request for the first segment to the server, the method further comprise:

transmitting a message informing abandoning of the request for the first segment to the server.

9. A streaming media data transmission system, comprising:

a server, configured to transmit a media segment containing media content to a client device according to a request of the client device;

the client device, configured to determine a preset threshold time, as a minimum value calculated from the transmission bit rate of each of N segments acquired previous the first segment by the transceiver, a time duration required for acquiring each of the N segments, a transmission bit rate of the first segment and a playable duration of the media content buffered, wherein N is an integer greater than 1; make a request for a first segment, to determine whether or not the first segment transmitted from the server is received within a preset threshold time from making the request for the first segment to the server; and if the first segment is not received within the preset threshold time, to send a request for a second segment to the server, wherein media contents contained in the first segment is the same as the media contents contained in the second segment, and the transmission bit rate of the first segment is higher than the transmission bit rate of the second segment.

10. The streaming media data transmission system of claim 9, wherein the client device is further configured to determine the preset threshold time according to one of following equations:

$$Tx = \frac{\left(\sum_{i=1}^{N} Ti\right) BWx}{\sum_{i=1}^{N} BWi}, \text{ or}$$

$$Tx = \min_{1 \leq i \leq N}\left(\frac{Ti \cdot BWx}{BWi}\right), \text{ or}$$

$$Tx = \min\left(\frac{Ts \cdot BWx}{BWs}, t3 - t0 - \frac{Ts \cdot BWx}{BWs}\right)$$

wherein Tx indicates the preset threshold time; BWi indicates the transmission bit rate of a $i^{th}$ segment previous the first segment; BWx indicates the transmission bit rate of the first segment; Ti indicates the time duration required for acquiring the $i^{th}$ segment acquired before the first segment by the transceiver, wherein i and N are both positive integers, and $1 \leq i \leq N$; Ts indicates the time duration required for acquiring the previous segment of the first segment by the transceiver; BWs indicates the transmission bit rate of the previous segment of the first segment acquired by the transceiver; t0 is a time when the transceiver transmits the request for the first segment to the server; t3 is a time on which a playback of the media content buffered in the client device at t0 would be completed; and min(•) indicates an operation of calculating a minimum.

11. The streaming media data transmission system of claim 9, wherein when it is determined that the first segment transmitted from the server is not received within the preset threshold time from making the request for the first segment to the server, before making the request for the second segment to the server, the client device is further configured to:
  select the second segment among one or more segments having different transmission bit rates, according to a network congestion condition occurred between the client device and the server,
  wherein the media contents contained in the one or more segments are the same as the media contents contained in the first segment, and the transmission bit rate of the one or more specific segments is lower than the transmission bit rate of the first segment.

12. The streaming media data transmission system of claim 9, wherein the client device is further configured to:
  transmit a message informing abandoning of the request for the first segment to the server, if it is determined that the first segment transmitted from the server is not received within the preset threshold time from making the request for the first segment to the server.

* * * * *